(12) United States Patent
Ro

(10) Patent No.: US 6,845,964 B2
(45) Date of Patent: Jan. 25, 2005

(54) ACTUATOR FOR AUTOMOTIVE AIR DUCT DAMPER

(75) Inventor: Hyuk Joon Ro, Koyang-si (KR)

(73) Assignee: Pro Quip International Korea Co., Ltd., Kyunggi-do (KR)

( * ) Notice: Subject to any disclaimer, the term of this patent is extended or adjusted under 35 U.S.C. 154(b) by 46 days.

(21) Appl. No.: 10/438,296

(22) Filed: May 14, 2003

(65) Prior Publication Data

US 2004/0227118 A1 Nov. 18, 2004

(51) Int. Cl.[7] .............................................. F16K 31/44
(52) U.S. Cl. ............................. 251/129.13; 251/129.11
(58) Field of Search ........................ 251/129.11–129.13

(56) References Cited

U.S. PATENT DOCUMENTS

| | | | | |
|---|---|---|---|---|
| 4,834,283 A | * | 5/1989 | Akabane et al. ............... 236/13 |
| 6,371,440 B1 | * | 4/2002 | Genga et al. ............ 251/129.03 |
| 6,471,580 B2 | * | 10/2002 | Ro ................................ 454/69 |
| 6,651,952 B1 | * | 11/2003 | Hightower et al. ............ 251/69 |

* cited by examiner

Primary Examiner—Paul J. Hirsch
(74) Attorney, Agent, or Firm—Law Office of Marc D. Machtinger, Ltd.

(57) ABSTRACT

The present invention relates to an actuator for automotive air duct damper, and more particular to an actuator for automotive air duct damper with a new structure which allows a precise control on the flow of the air supplied in the indoor space of a car and which is improved in durability. The actuator for automotive air duct damper according to the invention, includes a driving motor and a power transmitting mechanism for transmitting the torque of the driving motor to a damper, said power transmitting mechanism being provided at its final stage with the damper for opening and closing air duct, wherein said actuator further comprises a rotary member provided on a free end of the rotation shaft of the driving motor, and an optical sensor disposed so as to interact with the rotary member.

4 Claims, 7 Drawing Sheets

ACTUATOR FOR AUTOMOTIVE AIR DUCT DAMPER

TECHNICAL FIELD

The present invention relates to an actuator for automotive air duct damper, and more particular to an actuator for automotive air duct damper with a new structure which allows a precise control on the flow of the air supplied in the indoor space of a car and which is improved in durability.

BACKGROUND OF THE INVENTION

Figure 1:
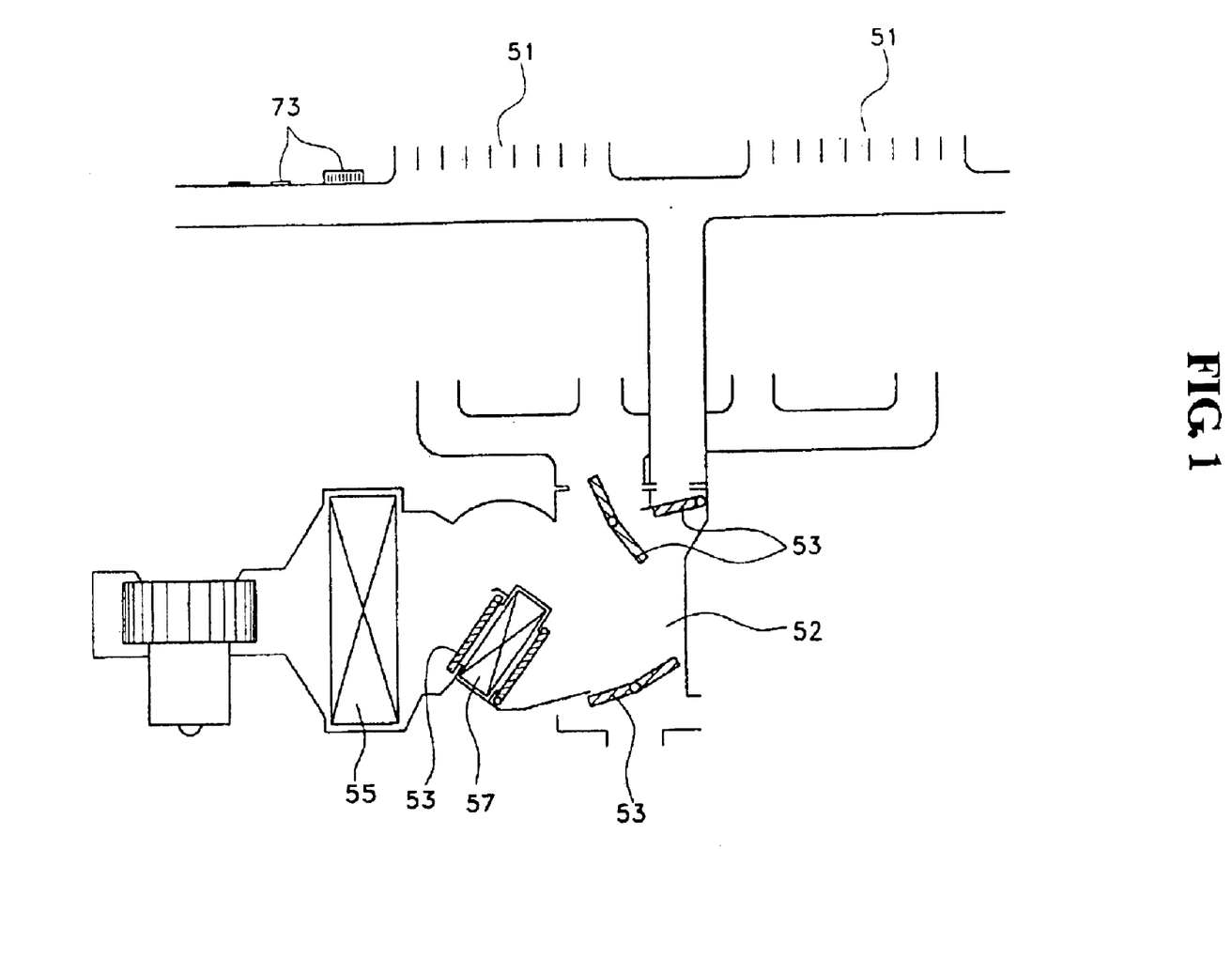
FIG. 1 shows the schematic arrangement of air ducts in a car.

Generally in a car, air ducts 52 connected to a number of ejecting openings 51 in communication with the interior of a car are provided to supply into the indoor space of a car either the air heated or cooled by a heater 57 or an air conditioner evaporator 55 or the fresh outside air, as shown in FIG. 1. Further, the air ducts 52 are provided with a number of dampers 53 to control the flow of the air supplied to the respective ejecting openings 51, wherein the dampers 53 are adjusted in their degree of opening by respective actuators feed-back controlled.

Figure 2:
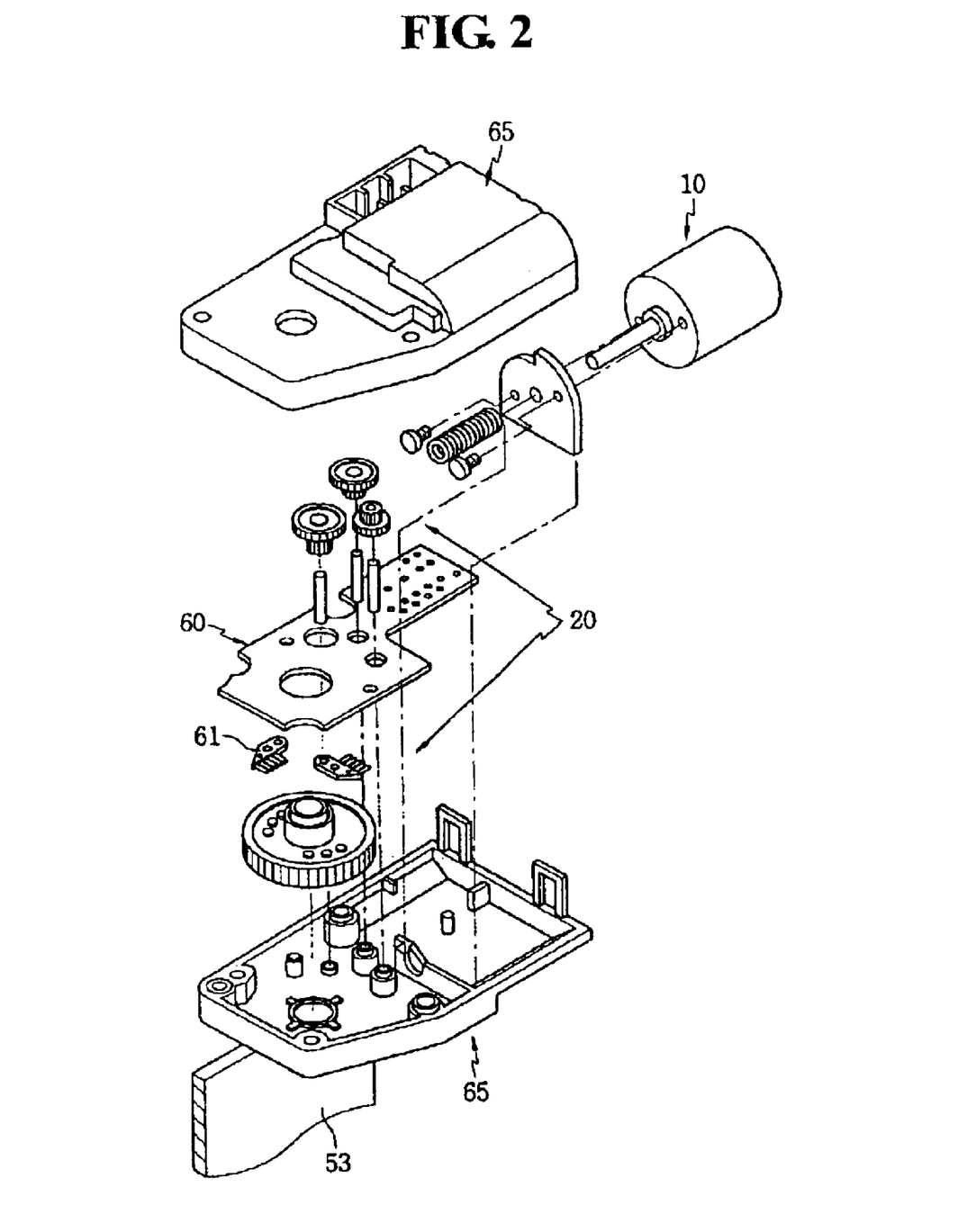
FIG. 2 shows the perspective exploded view of a conventional air duct damper actuator.
Figure 3:
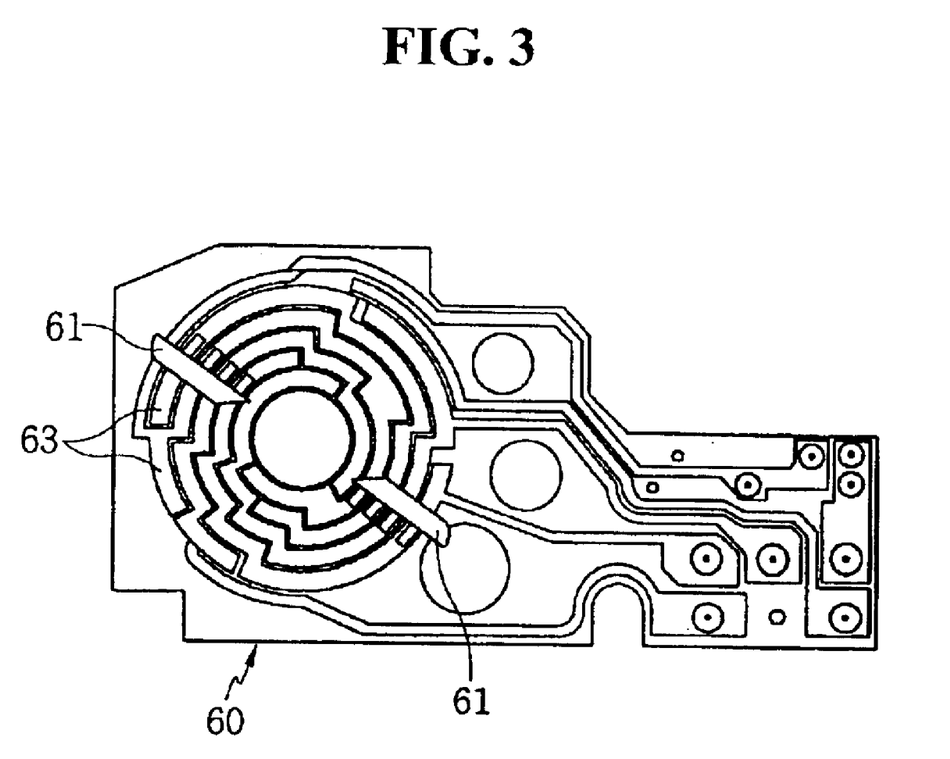
FIG. 3 shows a bottom view of a printed circuit board of a conventional air duct damper actuator.

A conventional actuator for adjusting the opening of an air duct damper comprises, as shown in FIG. 2, a driving motor 10 brought into rotation by a control section, a power transmitting mechanism 20 connected to the driving motor 10 for transmitting a torque of the motor 10 to a damper 53, a connection terminal 61 provided at the power transmitting mechanism 20 and brought into rotation together with the power transmitting mechanism 20, a printed circuit board 60 attached on a case 65 and on which the connection terminal 61 is rotatable contacted. Further, as shown in FIG. 3, a printed variable resistance band 63 is provided at the bottom of the printed circuit board 60 and connected to different circuit pattern in accordance with the change of the contact position of the connection terminal 61.

Therefore, when a passenger causes the transmission of a signal to the control section by operating an inputting section installed on an instrument panel, the above-described driving motor 10 is brought into rotation in accordance with the signal of the control section, opening the damper 53 connected to the driving motor 10 through the power transmitting mechanism 20 at a predetermined rotation angle. And, the connection terminal 61 is disposed on one side of the power transmitting mechanism 20 so as to be rotated together with the power transmitting mechanism 20, and the connection terminal 61 is rotated in contact with the variable resistance band 63, so that the feed back signal about the rotation angle of the damper 53 can be transmitted to the control section.

However, there is a problem with such an actuator in that the opening of a damper 53 is difficult to exactly control, when the resistance value becomes erroneous due to the deposition of a foreign material on the variable resistance band 63 or the connection terminal 61, the change in the temperature or the like, because the rotation angle indicating the duct opening is sensed as the variation in the resistance depending on the contacting location between the connection terminal 61 and the variable resistance band 63. There is another problem of the decreased durability of the commodities, because easy wear takes place with the repeated operation as the result of the tight contact operation between the connection terminal 61 and the variable resistance band 63.

Moreover, there is still other disadvantage of the need for a separate interface circuitry, because the analog resistance signal representing the opening of a damper 53, as sensed, needs to be converted to a corresponding digital signal in order to be used for the feed back control of the driving motor 10.

SUMMARY

The present invention is intended to resolve the problem as described above and so the object of the invention is to provide an actuator for automotive air duct damper with a new structure, which allows a precise control on the flow of the air supplied in the indoor space of a car by adjusting the opening of the damper precisely and which is improved in durability.

The above object is achieved according to the first feature of the invention by an actuator for automotive air duct damper, including a driving motor and a power transmitting mechanism for transmitting the torque of the driving motor to a damper, said power transmitting mechanism being provided at its final stage with the damper for opening and closing air duct, wherein said actuator further comprises a rotary member provided on a free end of the rotation shaft of the driving motor, and an optical sensor disposed so as to interact with the rotary member.

Preferably, the rotary member is formed into a circular cylinder having holes on its one side.

Alternatively, the rotary member is formed into a hemisphere and eccentrically installed on a free end of the rotation shaft of the driving motor.

The above object is also achieved according to the second feature of the invention by an actuator for automotive air duct damper, including a driving motor; a power transmitting mechanism comprising a driving gear provided on the rotation shaft of the driving motor, a worm gear engaged with the driving gear for transmitting the torque at a reduced speed, a driven gear rotatable in engagement with the worm gear, and a damper fixed on the rotation shaft of the driven gear, wherein said actuator further comprise holes formed on a predetermined location in the shaft of the worm gear of the power transmitting mechanism and an optical sensor disposed closely so as to interact with the holes.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. Preferred embodiments of the invention will be described in detail below by referring to the accompanying drawings.

Figure 4:
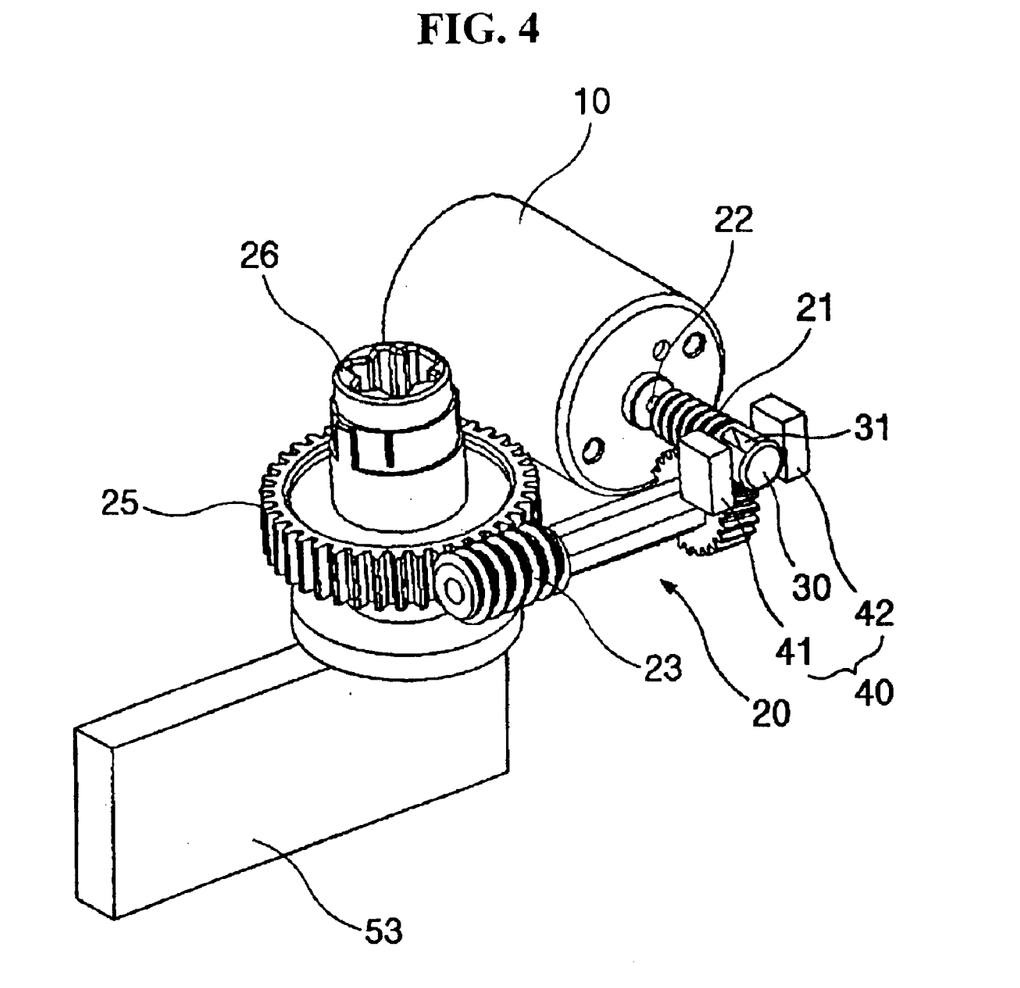
FIG. 4 shows the perspective view of air duct damper actuator according to the first embodiment of the invention.

As shown in FIG. 4, an actuator according to the invention comprises a driving motor 10, a power transmitting mechanism 20 for transmitting the torque of the driving motor 10 to a damper 53, a rotary member 30 provided on a free end of the rotation shaft 22 of the driving motor 10, and an optical sensor 40 disposed closely so as to interact with the rotary member.

The driving motor 10 which is connected to the damper 53 for air duct through a power transmitting mechanism 20 to regulate the opening of the duct is also connected to the control section (not shown) in the car, so that the rotating direction and rotated angle of the damper can be externally controlled.

The power transmitting mechanism 20 comprises a driving gear 21 provided on the rotation shaft 22 of the driving motor 10, a worm gear 23 engaged with the driving gear 21 for transmitting the torque at a reduced speed, and a driven gear 25 rotatable in engagement with the worm gear 23, on the rotation shaft of which driven gear 25 the damper 53 is mounted.

It is to be noted that as the power transmitting mechanisms 20, any other types of gears, belts or the like which are capable of precisely transmitting the torque of the driving motor 10 to a damper 53 at a reduced speed may be used.

Figure 5:
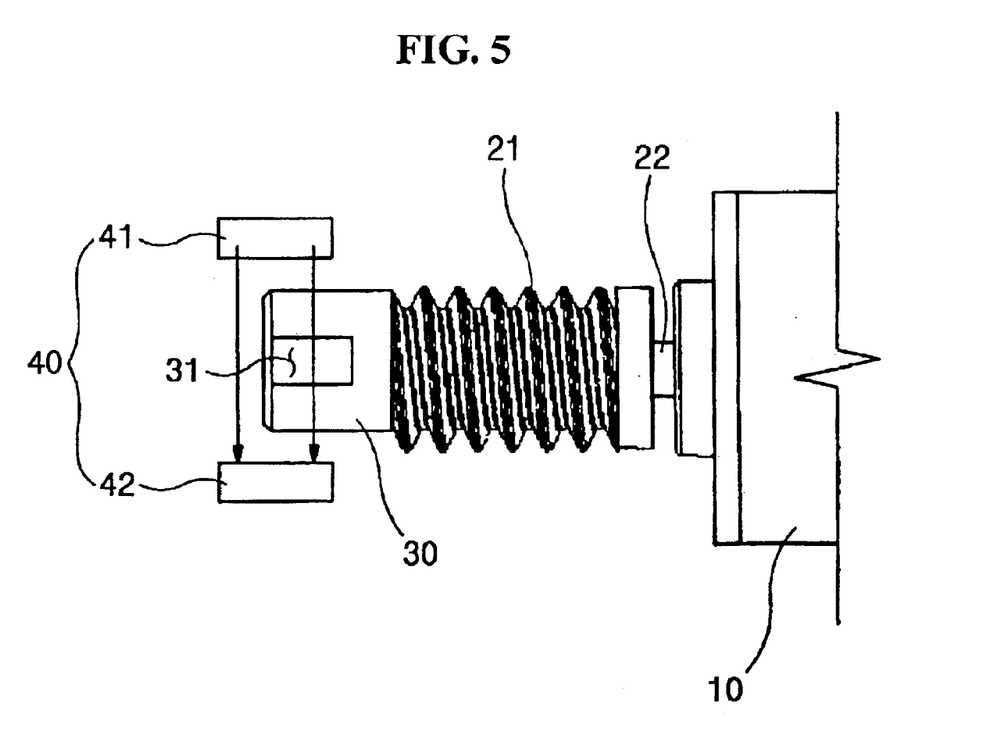
FIG. 5 shows the plane figure of the rotary member and the optical sensor of air duct damper actuator of FIG. 4.

The rotary member 30 in accordance with the first embodiment of the invention, as shown in FIG. 4 and FIG. 5, is formed into a circular cylinder having holes 31, installed as one body or an assembled structure on a free end of the rotation shaft 22 of the driving motor 10, and brought into rotation together with the driving motor 10.

Figure 6:
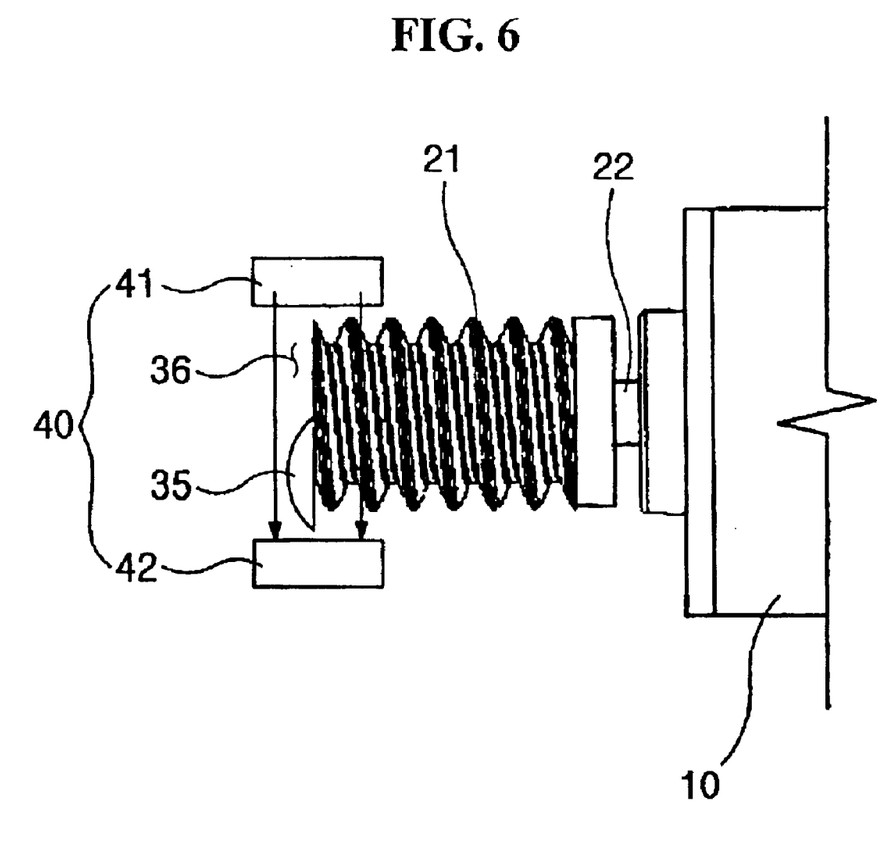
FIG. 6 shows the plane figure of air duct damper actuator according to the second embodiment of the invention.

Alternatively, the rotary member 35 in accordance with the second embodiment of the invention, as shown in FIG. 6, is formed into a hemisphere, installed eccentrically to the axis of a free end of the rotation shaft 22 of the driving motor 10 as one body or an assembled structure, and brought into rotation together with the driving motor 10.

The optical sensor 40 consists of an emitting part 41 and a receiving part 42 provided on the opposite sides of holes of the rotary member, so that those parts may detect the light passed through the holes. That is, the optical sensor 40, by sensing the light passed through the holes 31 of the rotary member 30 in the first embodiment of the invention or sensing the light passed through the empty space formed in the hemispheric rotary member installed eccentrically to the rotation shaft of the driving motor in the second embodiment of the invention, detects the number of revolutions, speed of revolution and rotated angle etc. of the rotary member 30, 35 revolved between the emitting part 41 and the receiving part 42 by the driving motor 10.

Further, the optical sensor 40 converts the optical signal incident to the receiving part into digital electric signal to be transmitted to the control section (not shown), so that the control section can detect the number of revolutions, rotated angle and speed of revolution of the driving motor 10 to thereby perform precise control of the opening of the damper 53.

In operation of the actuator for automotive air duct damper constructed as described above according to the first and second embodiments of the invention, when a passenger inputs signal into the control section (not shown) through the manipulation of the input buttons 73, the signals from the control section cause the driving motors 10 to operate, so that the flow of the air supplied into the indoor space of a car maybe adjusted through opening or closing of the dampers 53 installed in air ducts 52 to a finite degree.

Then, the number of revolutions, speed of revolution and rotated angle of the driving motor 11 are detected through the interaction between the optical sensor 40 and the rotary member 30, 35 equipped on the rotation shaft 22 of the driving motor 10 and the detected optical signals are transmitted to the control section (not shown) so that the opening of the damper 53 is feed-back controlled more precisely.

Figure 7:
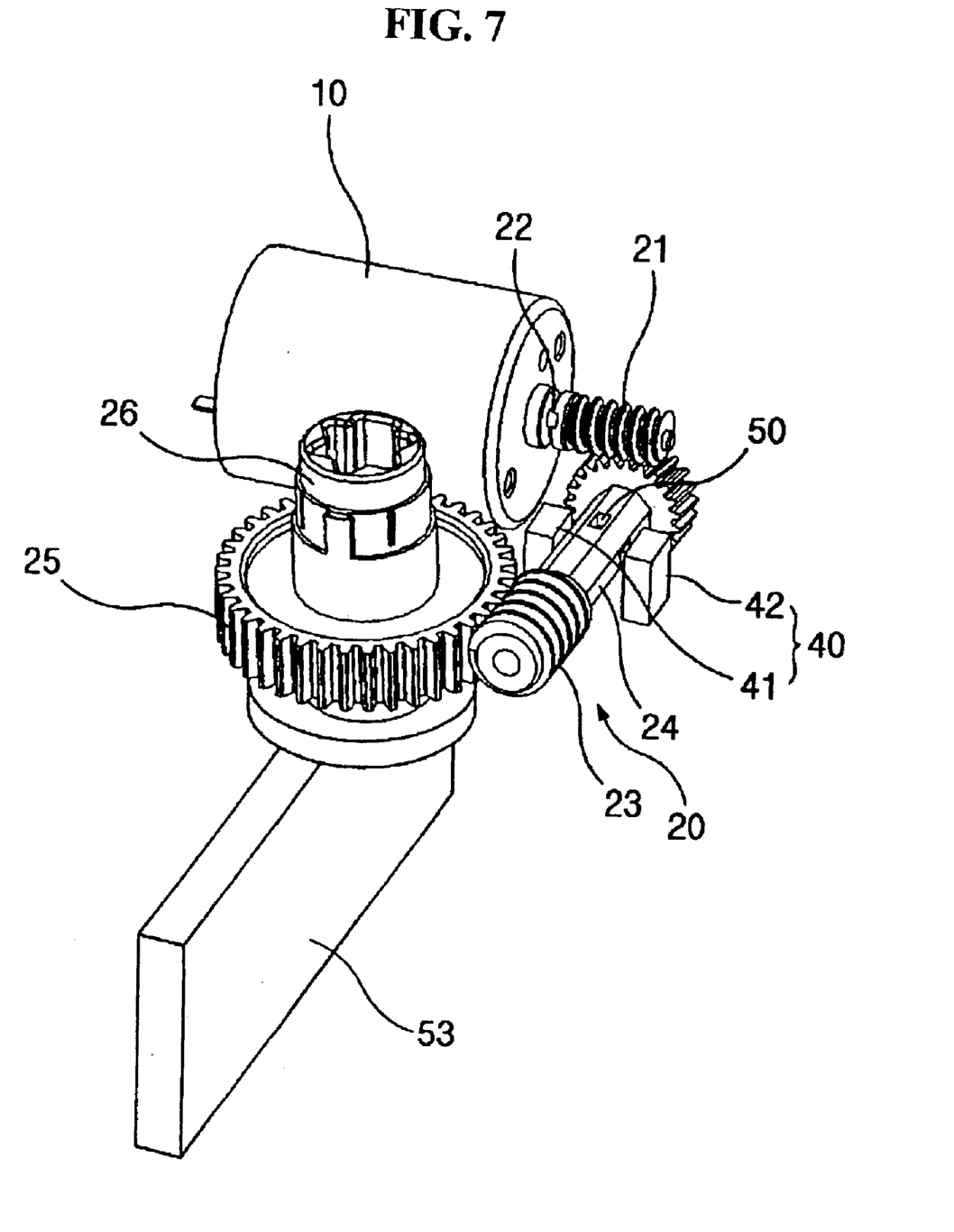
FIG. 7 shows the perspective view of air duct damper actuator according to the third embodiment of the invention.

Further, as shown in FIG. 7, an actuator in accordance with the third embodiment of the invention includes a driving motor 10; a power transmitting mechanism 20 comprising a driving gear 21 provided on the rotation shaft 22 of the driving motor 10, a worm gear 23 engaged with the driving gear 21 for transmitting the torque at a reduced speed, and a driven gear 25 rotatable in engagement with the worm gear 23; and a damper 53 fixed on the rotation shaft 26 of the driven gear 25, wherein said actuator further comprise holes 50 formed on a predetermined location in the shaft 24 of the worm gear 23 of the power transmitting mechanism 20 and an optical sensor 40 disposed closely so as to interact with the holes 50.

The driving motor 10 which is connected to the damper 53 for air duct through a power transmitting mechanism 20 to regulate the opening of the duct is also connected to the control section (not shown) in the car, so that the rotating direction and rotated angle of the damper can be externally controlled.

The power transmitting mechanism 20 comprises a driving gear 21 provided on the rotation shaft 22 of the driving motor 10, a worm gear 23 engaged with the driving gear 21 for transmitting the torque at a reduced speed, and a driven gear 25 rotatable in engagement with the worm gear 23.

The damper 53 is connected to a lower part of the rotation shaft 26 of the driven gear 25 and brought into rotation together with the driven gear 25.

The optical sensor 40 consists of an emitting part 41 and a receiving part 42 provided on the opposite sides of holes 50 formed on the axis 24 of the worm gear 23, so that those parts may detect the light passed through the holes 50. Accordingly, the optical sensor 40 detects the number of revolutions, speed of revolution and rotated angle etc. of the worm gear 23 revolved between the emitting part 41 and the receiving part 42 and converts the optical signal incident to the receiving part into digital electric signal to be transmitted to the control section (not shown), so that the control section can detect the number of revolutions, rotated angle and speed of the driving motor 10 to thereby perform precise control of the opening of the damper 53.

In operation of the actuator for automotive air duct damper constructed as described above in accordance with the third embodiment of the invention, when a passenger inputs signal into the control section (not shown) through the manipulation of the input buttons 73, the signals from the control section cause the driving motors 10 to operate, so that the flow of the air supplied into the indoor space of a car may be adjusted through opening or closing of the dampers 53 installed in air ducts 52 to a finite degree.

Then, the number of revolutions, speed of revolution and rotated angle of the driving motor 10 are detected through the interaction between the optical sensor 40 and the holes 50 of the worm gear 23 rotated at a reduced speed and the detected optical signals are transmitted to the control section (not shown) so that the opening of the damper 53 is feed-back controlled more precisely.

Accordingly, the durability of the commodities can be improved due to the no wear of sensors even after a long time service, because the driving motor 10 is feed-back controlled on the basis of the optical signals incident on light receiving parts 42, with the optical sensors 40 maintained out of contact with the rotary member. The conventional tedious signal processing procedure to convert analog signals into digital signals to be transmitted to the control section, the corresponding conversion circuits and the like can be dispensed with, because the number of revolutions, speed of revolution, rotated angle and the like of the driving motor 10 are detected in digital signals before transmission to the control section, with the result that the construction becomes simpler and the cost of the commodities can be decreased.

Further, as the actuators detect the rotated angle of dampers 53 according to the optical signals incident on light receiving parts 42 of the optical sensors 40, they are less influenced by the environments like foreign materials or temperature fluctuations than the conventional devices, and can realize precise control even through the detection of the rotating speed by means of digital optical signals. Moreover, according to the actuators of the first and second embodiments of the invention, as the rotary members are mounted on the rotation shaft 22 and so caused to rotate together with the driving motor 10, exact opening of those dampers 53 at desired angle is possible, because the driving motor 10 and the rotary members 30, 35 are rotated integrally for feedback control, even when back lashes or the like have happened in the course of transmitting the torque through power transmitting mechanisms 20.

As described above, according to the present invention, the actuators have the advantages that a precise control can be performed on the flow of the air supplied in the indoor space of a car by adjusting the opening of the damper precisely and the durability of the commodities can be improved.

Although the present invention has been described above with respect to the preferred embodiments, the scope of rights of the present invention is not limited thereto, but rather shall be determined by the appended claims and their equivalents, allowing various modifications, adaptations, etc. as those skilled in the art will understand.

What is claimed is:

1. An actuator for automotive the air duct damper including a driving motor and a power transmitting mechanism for transmitting the torque of the driving motor to a damper, said power transmitting mechanism being provided at its final stage with the damper for opening and closing air duct, wherein said actuator further comprises a rotary member provided on a free end of the rotation shaft of the driving motor, and an optical sensor disposed so as to interact with the rotary member.

2. The actuator for automotive air duct damper of claim 1, wherein said rotary member is formed into a circular cylinder having holes at its free end.

3. The actuator for automotive air duct damper of claim 1, wherein said rotary member is formed into a hemisphere and eccentrically installed on a free end of the rotation shaft of the driving motor.

4. An actuator for automotive air duct damper including a driving motor; a power transmitting mechanism comprising a driving gear provided on the rotation shaft of the driving motor, a worm gear engaged with the driving gear for transmitting the torque at a reduced speed, a driven gear rotatable in engagement with the worm gear; and a damper fixed on the rotation shaft of the driven gear, wherein said actuator further comprise holes formed on a predetermined location in the shaft of the worm gear of the power transmitting mechanism and an optical sensor disposed closely so as to interact with the holes.

* * * * *